(12) United States Patent
Beaudeau et al.

(10) Patent No.: US 10,097,225 B1
(45) Date of Patent: Oct. 9, 2018

(54) ALL-DIGITAL BLIND ADAPTIVE RECEIVER FOR NON-COOPERATIVE COMMUNICATIONS AND SIGNAL EXPLOITATION

(71) Applicant: BAE SYSTEMS Information and Electronic Systems Integration Inc., Nashua, NH (US)

(72) Inventors: Jonathan P. Beaudeau, Nashua, NH (US); John A. Tranquilli, Jr., Nashua, NH (US); Brandon P. Hombs, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/693,255

(22) Filed: Aug. 31, 2017

(51) Int. Cl.
*H04B 1/16* (2006.01)
*H04L 1/00* (2006.01)
*H04L 25/03* (2006.01)

(52) U.S. Cl.
CPC ............. *H04B 1/16* (2013.01); *H04L 1/0054* (2013.01); *H04L 25/03057* (2013.01); *H04L 25/03178* (2013.01)

(58) Field of Classification Search
CPC ... H04B 1/16; H04L 1/0054; H04L 25/03057; H04L 25/03178
See application file for complete search history.

(56) References Cited

U.S. PATENT DOCUMENTS

| | | | | |
|---|---|---|---|---|
| 5,832,046 A | * | 11/1998 | Li | H04L 7/0054 375/355 |
| 8,401,117 B1 | * | 3/2013 | Su | H04L 27/0006 375/316 |
| 9,001,911 B2 | * | 4/2015 | Fimoff | H04L 1/0045 375/261 |
| 9,118,519 B2 | * | 8/2015 | Eliaz | H04L 25/03305 |

(Continued)

OTHER PUBLICATIONS

Cummings, William C., "Adaptive Nulling Antenna for Military Satellite Communications, An", The Lincoln Laboratory Journal, 1992, vol. 5, No. 2, pp. 173-194.

(Continued)

*Primary Examiner* — Sophia Vlahos
(74) *Attorney, Agent, or Firm* — Finch & Maloney PLLC

(57) ABSTRACT

A method of digital signal processing includes modeling a digitally-modulated radio frequency (RF) communication stream using a set of incoming samples of the stream collected from a single antenna. The stream includes a first signal, the first signal including a sequence of first digital symbols having a previous symbol and a current symbol. Each first digital symbol is chosen from a plurality of first possible values. The first signal is modulated by a first known RF communication protocol having unknown time-varying parameters, the parameters having estimated previous values from modeling the previous symbol using a previous interval of the samples corresponding to the previous symbol. The method further includes collecting a current interval of the samples, predicting current values of the parameters, deciding a value of the current symbol using maximum likelihood estimation, and estimating the current values of the parameters using maximum likelihood estimation.

20 Claims, 7 Drawing Sheets

(56) References Cited

U.S. PATENT DOCUMENTS

| 2006/0047842 A1* | 3/2006 | McElwain | H03M 13/2957 |
| | | | 709/231 |
| 2006/0067381 A1* | 3/2006 | Chakravarthy | H04B 1/7143 |
| | | | 375/130 |
| 2007/0030798 A1* | 2/2007 | Okada | H04L 27/2657 |
| | | | 370/208 |

OTHER PUBLICATIONS

Gardner, William A., "Cyclic Wiener Filtering: Theory and Method", IEEE Transactions on Communications, Jan. 1993, vol. 41, No. 1, pp. 151-163.

K. Grover et al., "Jamming and Anti-jamming Techniques in Wireless Networks: A Survey", International Journal of Ad Hoc and Ubiquitous Computing, Dec. 2014, vol. 17, No. 4, pp. 197-215.

Gordon, N. J., et al., "Novel Approach to Nonlinear/non-Gaussian Bayesian State Estimation", IEE Proceedings F—Radar and Signal Processing, Apr. 1993, vol. 140, No. 2, pp. 107-113.

* cited by examiner

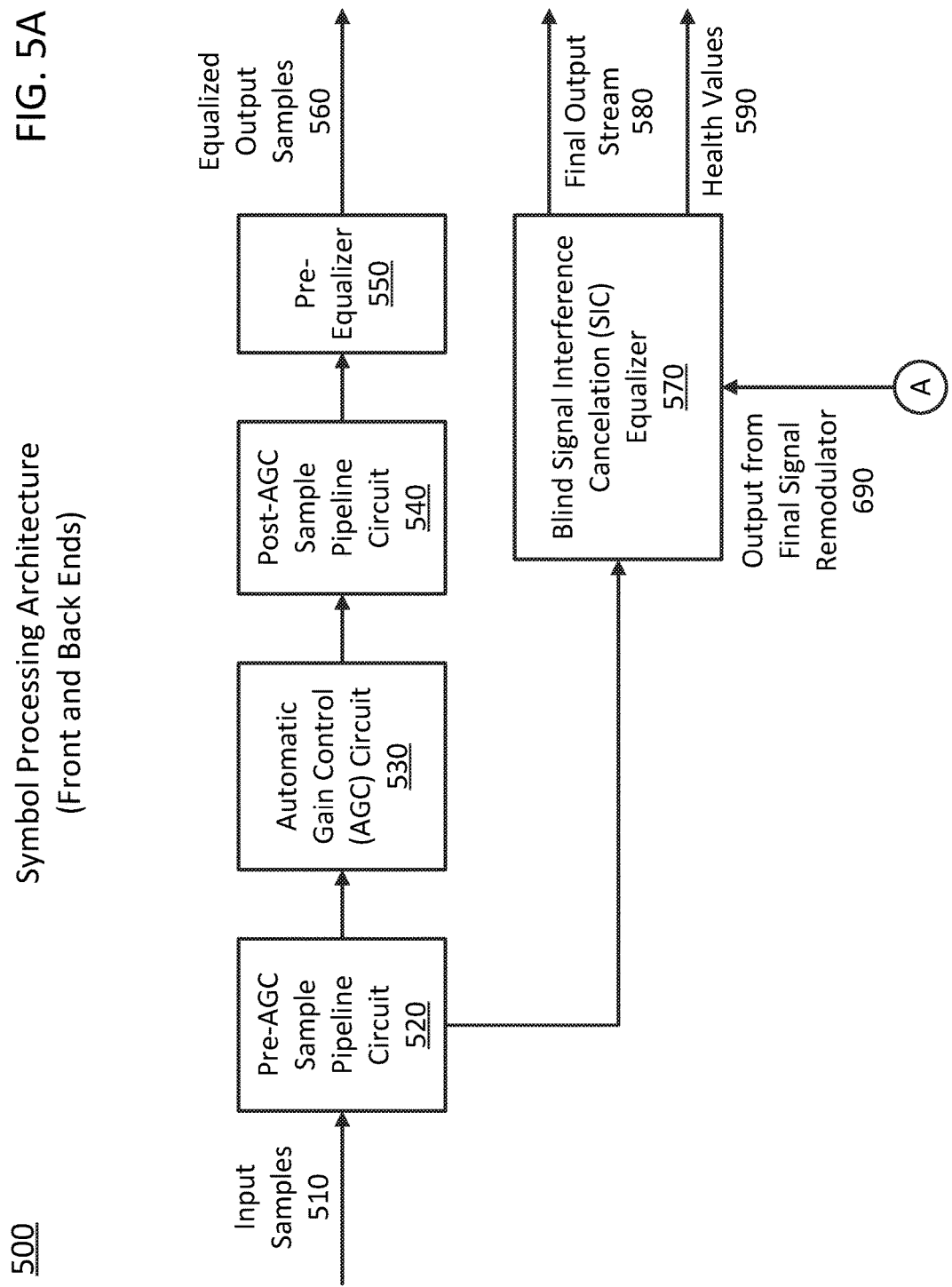

700     Current Symbol Processing Method     FIG. 6

Model digitally-modulated radio frequency (RF) communication stream using set of incoming samples of stream collected from single antenna, stream including first signal, first signal including sequence of first digital symbols having previous symbol and current symbol, each first digital signal being chosen from plurality of first possible values, first signal being modulated by first known RF communication protocol having unknown time-varying parameters, parameters having previous estimated values from modeling previous symbol using previous interval of samples corresponding to previous symbol
710

Collect current interval of samples, current interval beginning after end of previous interval and corresponding to current symbol
720

Predict end of current interval, and current values of parameters, based on estimated previous values of parameters
730

Decide value of current symbol using maximum likelihood estimation based on first possible values, predicted current values of parameters, and subset of collected current interval of samples
740

Estimate current values of parameters using maximum likelihood estimation based on decided value of current symbol, collected current interval of samples, and predicted current values of parameters
750

ALL-DIGITAL BLIND ADAPTIVE RECEIVER FOR NON-COOPERATIVE COMMUNICATIONS AND SIGNAL EXPLOITATION

FIELD OF THE DISCLOSURE

This disclosure relates to an all-digital blind adaptive receiver for non-cooperative communications and signal exploitation.

BACKGROUND

A communications receiver usually requires relatively accurate a priori knowledge of the signal communication parameters, such as the symbol rate and the carrier frequency offset, used in the transmission of a communication signal. In a cooperative link setting (such as when transmitter and receiver are working cooperatively), this can be established as part of the receiver design. For example, the receiver can be designed to support one or more discrete sets of symbol rates used by the transmitter. Coordination between the transmitter and receiver can be used in such environments to ensure the operating symbol rate matches within some tolerance. In contrast, within a non-cooperative setting (such as when the receiver is not an intended recipient of the transmissions or when the transmitter is not transmitting according to an established public protocol), there is no a priori knowledge of the symbol rate. Accordingly, matched-filter approaches cannot operate properly in this environment; since the filter coefficients need to be set based on a given samples-per-symbol relationship (derived from the symbol rate), which is unknown a priori.

BRIEF DESCRIPTION OF THE DRAWINGS

Features of embodiments of the claimed subject matter will become apparent as the following Detailed Description proceeds, and upon reference to the Drawings, wherein like numerals depict like parts.

FIGS. 5A-5B are block diagrams of an example symbol processing architecture, according to an embodiment of the present disclosure.

FIG. 6 is a flow diagram of an example current symbol processing method, according to an embodiment of the present disclosure.

Figure 1:
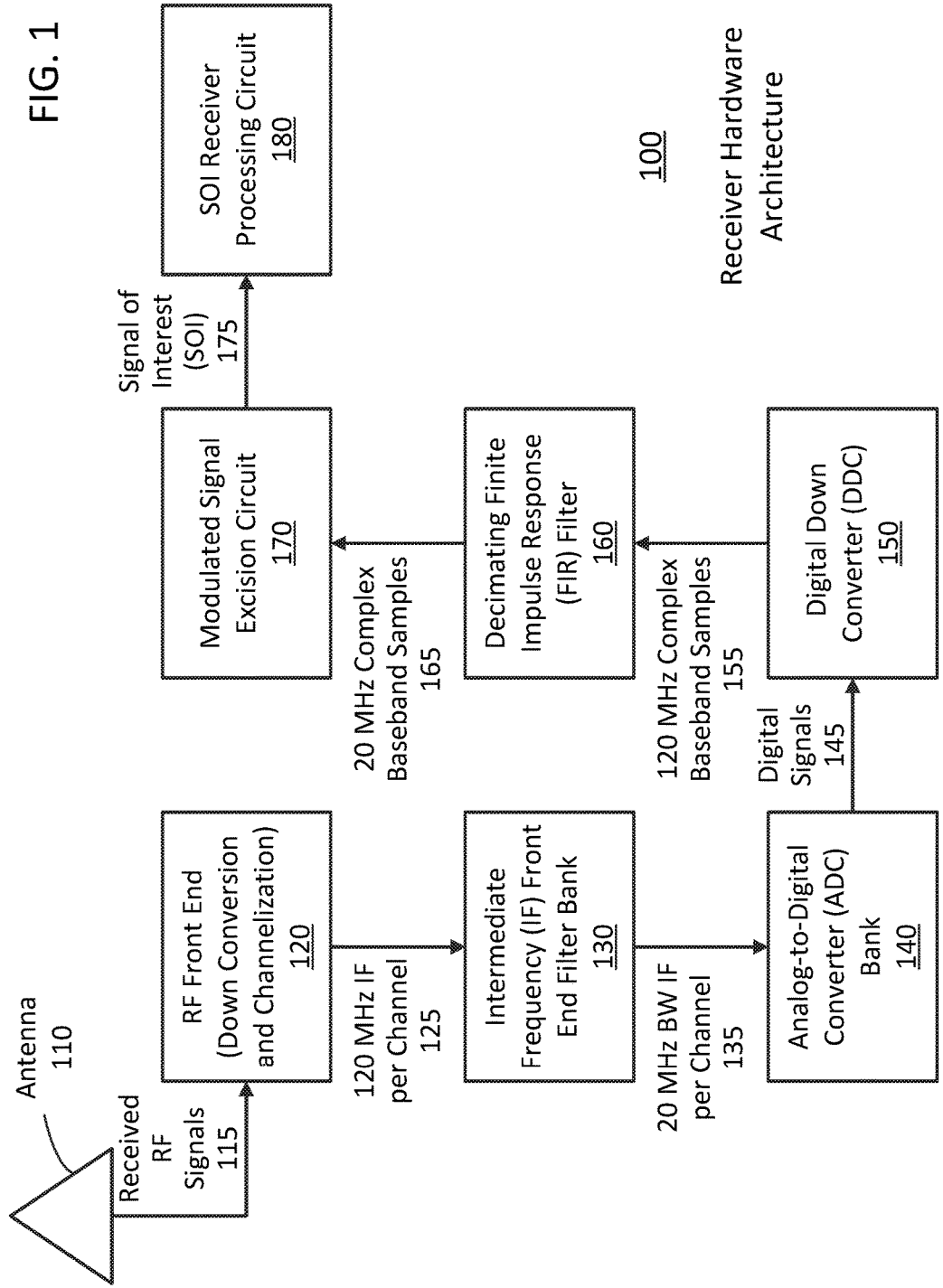
FIG. 1 is a. block diagram of an example receiver hardware architecture, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

According to one or more embodiments of the present disclosure, within a non-cooperative communication setting, the receiver has no a priori knowledge of the symbol rate, and adapts to a continuum of possible symbol rates. This eliminates the need for receiver matched filters. According to one or more embodiments, maximum-likelihood estimation is used to determine on a per-symbol basis signal processing or phase parameters such as the relative baseband (symbol) and carrier phase for each sample. As the number of samples within a symbol can vary depending on the possibly varying symbol rate, the approach jointly estimates these phase parameters along with the symbol boundaries, and performs data association to maintain the sample-symbol relationship (such as which samples belong to which symbols at a given period of time).

According to various embodiments of the present disclosure, techniques of adaptive receiving include the ability to demodulate, track, and accurately reconstruct multiple wideband modulated signals using a single antenna without a priori knowledge of static or time-varying signal parameters such as symbol rate, carrier frequency offset, radio frequency (RF) channel, and modulation type. The techniques also include the ability to accomplish this demodulating, tracking, and reconstructing in a fully-digital scheme (e.g., can keep the sample rate fixed and not have to tweak any hardware dynamically). The techniques further include successful non-cooperative blind multi-user signal reception that does not rely on matched filters (e.g., because the techniques are blind to the signal modulation parameters, the techniques have no knowledge of the parameters and therefore have nothing to match). The techniques also include the ability to perform all these functions with highly dynamic signals (e.g., the techniques include processing signals that are varying their RF channels, power levels, frequency offsets, and symbol rates, to name a few, over time.

According to one or more embodiments, a closed-loop approach (such as a feedback model) maintains a model of received samples that are synthesized at each symbol period based on predicted values of the phase and boundary parameters, then applying corrections to these parameters by optimizing the likelihood surface (such as through iterative gradient descent) that is obtained through comparison of the model samples to what has actually been received. In another embodiment of the present disclosure, this technique is implemented on hardware for Minimum-Shift-Keying (MSK) type signals (e.g., modeling MSK-encoded digital signals). In still further embodiments, the technique is applied to any digitally-modulated signal (with minor modifications to the way the model samples are generated).

In some embodiments, the model is predetermined, such as a frequency-modulated carrier frequency encoding a fixed number of symbols (e.g., digital modulation) at a particular symbol rate. The parameters to the model (e.g., carrier frequency, symbol rate, and so on) are then estimated from the samples, with maximum likelihood estimation (e.g., through gradient descent or other technique) to refine the estimated parameters, such as finding the parameter values for which such a model has the greatest likelihood of generating the observed samples. In some other embodiments, the model is selected from a group of possible models based on the observed samples.

In one or more embodiments, this technique assumes no knowledge of communication parameters such as the carrier frequency offset or the symbol rate, and is capable of successfully adapting to signals that can take on a large variation in these parameters. For example, in some embodiments; this technique is effective for signal symbol rates that range from less than 10% to up to 100% of the receiver sample rate. According to some embodiments, the technique is entirely digital; with a fixed sample rate being used and without dynamic changes to the sampling clock or radio frequency (RF) carrier. In some embodiments, due to the maximum-likelihood nature of the approach, the technique not only successfully demodulates the underlying information bits, but also accurately reconstructs the signal waveform, which can be of high value for several applications (for example, interference mitigation). Additionally, in some embodiments, the technique tracks the sample/symbol relationship on a per-symbol basis, so is capable of handling dynamic changes to the symbol rate itself.

In some embodiments, this technique eliminates strict timing requirements between the transmitter/receiver baud rate clocks as the receiver is capable of tracking much larger offsets. For instance, baud rate clocks can usually only tolerate deviations specified in terms of parts per million, whereas this technique is capable of tolerating large percentage offsets. There are numerous use cases within a cooperative communication setting as well. One specific example involves quality-of-service management; where a waveform can choose between a fixed set of data rates at which to communicate, however, any change of rate requires a re-negotiation (handshaking) process between the transmitter/receiver. According to various embodiments of the present disclosure, this handshaking is not needed with this technique as the receiver can automatically adapt to a change in rate. As such, in some embodiments, the receiver is used in a cooperative setting, such as the intended recipient of a communication whose protocol (e.g., symbol rate, carrier frequency offset, and the like) changes dynamically and without coordination between the transmitter and the receiver or between the transmitter and a known protocol (e.g., a communication protocol whose parameters are already known to the recipient).

For instance, in some embodiments, the receiver is blind to the communication protocol (e.g., may be aware of the technique in general, such as minimum-shift keying, but is unaware of the particular parameter values used to generate the technique, and these parameter values may change dynamically in a manner not predictable by the receiver). Here, the communication symbol values making up the signal are assumed to be discrete (e.g., digital), while the communication protocol parameter values used to modulate the symbol values are assumed to be continuous (e.g., varying in a continuous fashion over time).

General Overview

In one or more embodiments, a generalized framework for single-antenna blind adaptive excision is presented. The approach is capable of excising multiple independently-modulated wideband interferers from a signal of interest (SOI) in real-time. The approach can be applied to a wide variety of techniques including anti jamming (such as anti jam interference excision) within a tactical communications environment, adaptive line rate changing without handshaking (e.g., the transmitter can change its symbol rate and know that the receiver will be able to adapt without some handshaking protocol), blind multi-user communications, single antenna co-channel interference excision, and single antenna adjacent channel interference excision. In an embodiment, the approach is implemented within a field-programmable gate array (FPGA) hardware platform.

According to some embodiments of the present disclosure, interference (for example, a jammer signal, a competing signal on the same or similar communication protocol, or the like) is effectively excised from a signal of interest (SOI). In some such embodiments, this excision is performed digitally. In some such embodiments, this excision is performed using a single receiver antenna. In an embodiment, an interference waveform is excised from single-antenna SOI reception. The interference waveform can include one or more digitally-modulated signals. According to one embodiment, an adaptive nonlinear filter that is agnostic to the SOI is used to separate the interference waveform from the SOI and other noise. In some other embodiments, the SOI itself is modeled and determined, even if the signal transmission parameters, such as the carrier frequency or the symbol rate, are varying. This can be useful, for example, when there is no strict protocol between the transmitter and the intended receiver.

The capability to effectively excise interference from reception of the SOI can be very useful. For example, in a tactical communications environment; a jammer threat can be neutralized if its footprint can be removed from the received signal. Single antenna interference excision is a highly attractive objective as jam suppression performance can be made resilient to instantaneous spatial configurations and any need for costly hardware changes is eliminated if such interference excision is performed digitally. Accordingly, unlike other techniques—such as with analog hardware, or narrowband filtering, or special cases such as cyclostationary analog interference removal (e.g., synchronized cyclically)—in one or more embodiments of the present disclosure, the interfering signal or signals (that may be generated, for example, in a non-cooperative environment) are separated from the SOI using digital processing across a wideband spectrum and with no a priori assumptions of particular parameter values governing the modulation of the interfering signals. In some embodiments, the receiver is used to recreate and separate the interfering signals from the SOI. These digital modulation techniques work well, even when the interference generator (or generators) attempts to match the SOI spectrum.

Architecture and Methodology

FIG. 1 is a block diagram of an example receiver hardware architecture 100, according to an embodiment of the present disclosure. The receiver 100 is intended to capture a relatively large bandwidth 115 of the radio frequency (RF) spectrum through a single antenna 110. The received RF signals 115 are ultimately channelized down to multiple 5 megahertz (MHz) channels via a cascade of circuits and other signal processing elements such as an RF front end 120, an analog intermediate frequency (IF) front end filter bank 130, an analog-to-digital converter (ADC) bank 140, and one or more digital down converters (DDCs) 150 and decimating finite impulse response (FIR) filters 160.

In further detail, RF front end 120 down converts the received RF signals 115 into intermediate frequency (IF) signals. For example, the RF front end 120 down converts the received RF signals 115 into separate channels 125, each having IF signals spanning 120 MHz. Put another way, the received RF spectrum is sliced into 120 MHz wide portions 125 by the RF front end, each portion being a different channel (range) of IF signals. Each channel is then run through an IF front end filter bank 130 to convert the 120 MHz of bandwidth (BW) into six separate channels 135 of 20 MHz apiece (e.g., each of six filters converts a different 20 MHz of BW from the 120 MHz of IF signals). The 20 MHz channels 135 of IF signals are then input to the ADC bank 140 to convert the analog signals to digital signals 145. The digital signals 145 are input to the DDC 150, which converts the digital signals 145 into 120 MHz complex baseband samples 155, which are in turn converted to 20 MHz complex baseband samples 165 by the decimating FIR filter 160. This 20 MHz complex baseband stream 165 becomes the input to a modulated signal excision circuit 170, which is described in further detail with reference to FIG. 2.

Briefly, the modulated signal excision circuit 170 identifies interfering modulated signals in the complex baseband signals 165, models the interfering signals to uncover their (likely) underlying waveforms created by their transmitter (or transmitters) when modulating and transmitting the signals, and uses these recreated waveforms to separate (or excise) the interfering signals from the rest of the complex baseband signals 165. The signal of interest (SOI) 175 (and possibly other noise) is what remains after the excision, and is output from the modulated signal excision circuit 170 and sent to an SOI receiver processing circuit 180 for further processing, such as processing that might take place had there been no interference to begin with, and the samples 165 been sent directly to the SOI receiver processing circuit 180.

In some embodiments, the interference is assumed to follow a known communication protocol using digital modulation (e.g., symbol based), only the parameters defining that protocol (such as carrier frequency and symbol rate) are unknown (and possibly varying over time). The communication protocol is assumed to fall within a captured bandwidth range and is sampled (such as uniformly sampled over time). Accordingly, in such embodiments, the interference protocol is assumed (e.g., guessed, selected from a list, detected, estimated, or provided in some other way), and a model of that protocol is maintained. The model includes the parameters of that protocol, some of which may stay fixed and some of which may vary between symbols or over time. For example, in one embodiment, the interference is assumed to employ frequency-hopping across the captured bandwidth. In one embodiment, the receiver 100 is assumed to use an independent excision module and that exists on each intermediate 20 MHz sample stream 165.

In some embodiments, the SOI itself is modeled (e.g., instead of or in addition to any interfering signals). For example, when the SOI is being transmitted by a time-varying protocol whose exact parameter values are known only to the transmitter, the receiver can treat the SOI like it was another interfering signal, model the underlying symbols, their corresponding transmission parameters, and their corresponding transmitted (and received) waveforms, and pass the reconstructed symbol string to the SOI receiver processing circuit 180 for further processing.

Each complex baseband stream sample from one of the 20 MHz sample streams 165 can be expressed as a weighted sum (using decimating filter impulse responses from the FIR filter 160 for the weights) of components that make up each of the input samples to the FIR filter 160, such as an interference component, an SOI component, and a noise component. The interference component can be modeled based on an assumed pattern of interference, such as from some fixed number of interference sources each contributing to the interference component in a somewhat consistent fashion, albeit with different parameter values controlling each interference source, The output of the model can be used in conjunction with an adaptive filtering technique to produce a corresponding sequence of estimated interference components from the samples that maximally suppresses the interference contribution to the 20 MHz sample stream 165.

Figure 2:
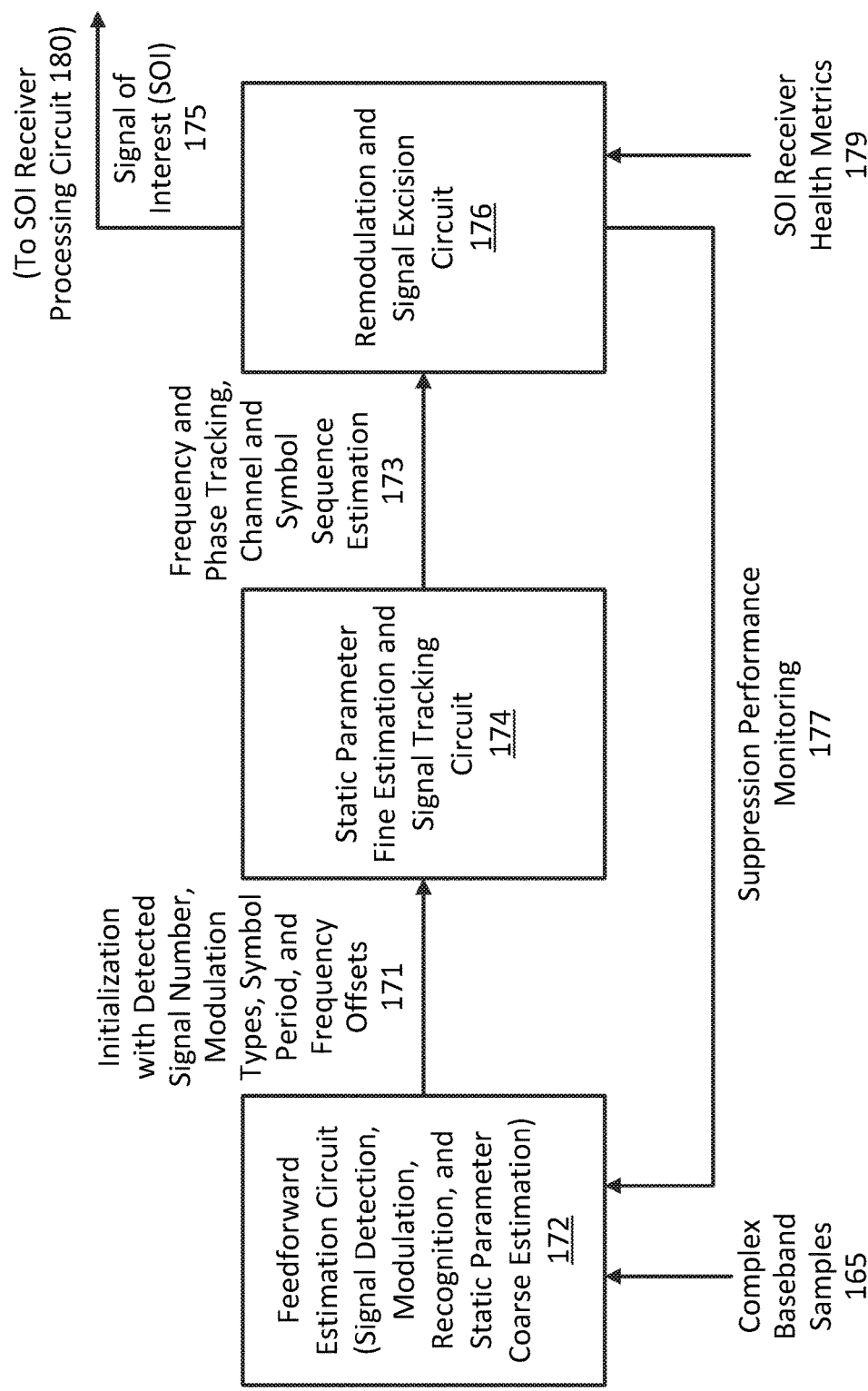
FIG. 2 is a block diagram of an example modulated signal excision circuit of the receiver of FIG. 1, according to an embodiment of the present disclosure.

FIG. 2 is a block diagram of an example modulated signal excision (MSE) circuit 170 of the receiver 100 of FIG. 1, according to an embodiment of the present disclosure. FIG. 2 is a high-level view of the framework to construct a blind MSE technique. The MSE circuit 170 includes a feedforward estimation circuit 172, a static parameter fine estimation and signal tracking circuit 174, and a remodulation and signal excision circuit 176.

In the feedforward estimation circuit 172, a model of the communication infrastructure (e.g. SOI, interference pattern, noise) is built (e.g., detected, guessed, estimated, based on current designs, selected from a list, or the like). The model has several unknown parameters (e.g., number of interferers, modulating functions for each interferer, parameter values for the modulating functions, and so on). A coarse estimate 171 or prediction of the slow-varying parameters, such as symbol periods and frequency offsets, is then obtained from the feedforward estimation circuit 172. The collected information, such as initialized detected signal count, modulation types, symbol period, and frequency offsets 171 thus far becomes part of a feedforward estimation process that is then used to initiate fine parameter estimation and signal tracking (in the static parameter fine estimation and signal tracking circuit 174) involving estimation of the interferer channels, time-varying phases, and symbol sequences 173. The frequency and phase tracking, channel and symbol sequence estimates 173 are input to the remodulation and signal excision circuit 176.

In the remodulation and signal excision circuit 176, final signal remodulation (e.g., recreation) and excision (e.g., removal) is done using the model tracking results. Continuous monitoring is carried out, which uses a metric tied to suppression performance in conjunction with SOI receiver performance metrics (frame synchronization scores and symbol error rate), which in turn allows the MSE circuit 170 to react to initial model detection errors or sudden changes to the interference environment. The remodulation and signal excision circuit 176 outputs the SOI 175 for use by other circuits, such as the SOI receiver processing circuit 180. The SOI 175 can be, for example, the sample stream 165 with the modeled interference components suppressed or excised. In the meantime, suppression performance monitoring 177 information is fed back from the remodulation and signal excision circuit 176 to the feedforward estimation circuit 172 to refine the model of the communication infrastructure (e.g., add or remove interference streams, re-base streams undergoing large changes in their communication protocol parameters) based on the generated SOI 175 and the excised interference components after processing by the static parameter fine estimation and signal tracking circuit 174 and the remodulation and signal excision circuit 176. In addition, the remodulation and signal excision circuit 176 is fed back various SOI receiver health metrics 179 from other components (such as the SOI receiver processing circuit 180) to improve the SOI generation (e.g., remodulation and interference signal excision) process.

In one embodiment, the combined process of signal tracking (e.g., from the static parameter fine estimation and signal tracking circuit 174) and remodulation and excision (e.g., from the remodulation and signal excision circuit 176) is applied to a specific modulation type, namely minimum-shift keying (MSK). In some other embodiments, this process is applied to other modulation types. The goal is to form a parameterized model of the discrete sequence of samples that was obtained by the receiver 100, such as determining values for the parameters that drive the model (e.g., the parameter values most likely to generate the observed samples, as with maximum likelihood estimation). A difficulty arises in representing the relative time offset of the received signal. Since there is not necessarily an integer relationship between the sample rate and the symbol rate of a given signal, each offset is in general time-varying.

Accordingly, the symbol waveform, carrier phase, and time-varying frequency parameters are tracked, and the symbol advanced when the signal rolls over a symbol boundary. From this, each sample is mapped to its corresponding symbol, and the boundaries of future symbols estimated from the boundaries of previous symbols.

In further detail, in one embodiment, the time-varying parameters that are tracked include data sequence, symbol boundaries, symbol phase, symbol rate, carrier phase, and carrier rate. The noise component can be assumed to be an uncorrelated Gaussian process. To simplify subsequent modeling, in one embodiment, the coloring induced by the filtering process here can be ignored and the noise contribution can be assumed to be white. In some other embodiments, the model can be extended to follow the colored noise. However, this is usually not needed as the SOI term is usually the dominant "noise" when modeling and estimating the interference. As stated previously, in an excision context, a signal processing goal can be to model and recreate the interfering components so that they can be excised from the sample stream, leaving the SOI and other noise for the SOI receiver processing circuit 180 to process. To remain truly agnostic to the SOI waveform, in one embodiment, prior information regarding the SOI statistics cannot be assumed within the model, so the SOI contribution to the samples is also assumed to be Gaussian. This works well when the SOI power is relatively low. In some embodiments, when handling higher SOI power, the modeling is specialized to particular SOIs (such as when the communication protocol and possible parameters of the SOI are known or can be closely approximated) to perform better.

While a maximum likelihood estimator of the parameter set can be derived from the joint measurement likelihood function of a sample set, it is noted that the corresponding norm-minimization is non-convex and the dimensionality of the parameter space is relatively high. Accordingly, in some embodiments, this difficulty is alleviated by incorporating prior information that was obtained through the feedforward estimation process, and exploiting the assumed dynamics of the time-varying parameter set. In some embodiments, the unknown parameter set is assumed to be random and uncertainty is incorporated into the dynamics. For example, a Bayesian approach such as sequential Monte Carlo can be leveraged to track the parameter sequence. In some other embodiments, complexity can be reduced or minimized to permit feasibility of a real-time hardware implementation. In some such embodiments, iterative gradient descent can be used.

In an example iterative gradient descent embodiment, assume there is an estimate of the parameter set for a previous time, where the previous time corresponds to the last sample of the previous symbol (such as a predicted last sample of the previous symbol). Further, it is desired to update the estimate of the parameter set to a current time, where the current time corresponds to the last sample of the current symbol (such as a predicted last sample of the current symbol). As discussed above, the symbol rate can vary over time, so dynamically estimating the symbol rate and symbol boundaries is part of the signal and parameter estimation process. Thus, the previous time and the current time can be chosen to align with predicted symbol boundaries (e.g., at the end of their corresponding sampling periods or intervals), and the previous parameter set estimates and the current parameter set estimates can align with the predicted symbol boundaries.

Prediction candidates are then formed that enumerate the possible values for the current symbol value, while the symbol period and carrier frequency offset are predicted. A symbol decision can then be made from the predicted candidates using the predicted parameter values by employing maximum likelihood estimation to select the one of the possible symbol candidates that, when synthesized using the predicted parameter values, produces the remodulated waveform closest to the sampled waveform. For example, the symbol can be chosen from the possible symbol values that is the most likely symbol value to produce the observed interference component.

In one embodiment, it is assumed that symbol decisions for each interferer can be made individually, e.g., when deciding for one interferer's signal, it is assumed that full parameter set estimates already exist for the remaining interferers. This is not generally the case and in some embodiments, it may be necessary to form symbol decisions jointly for all interference signals. However, such a solution grows with exponential complexity as the number of interferers increases and thus it is desirable to use the individual symbol decision assumption whenever possible. Since the interferers are generally asynchronous to one another, one can attempt to enforce this by selecting estimate update instants to stagger necessary symbol decisions (rather than simply aligning with symbol boundaries as mentioned before). The worst case occurs when there is phase synchronization between interferers; in this case, the exponential solution is forced, which usually requires resorting to a suboptimal multiuser detection (MUD) algorithm if the number of interferers is prohibitively large.

Once the candidate predictions for the time-varying parameter set are selected reflecting the newly formed symbol decision, a correction is made to the continuous parameters in order to form the estimate for the next set of time-varying parameters via gradient descent (e.g., fine estimates are computed using maximum likelihood estimation based on the recently made symbol decision). This allows a model of the interference contribution to be synthesized (e.g., remodulated) and that can be excised from the received sample sequence. For instance, the interference contributions can be excised to leave the SOI and other (e.g., noise) components in the sample stream for processing by the SOI receiver processing circuit 180.

While the estimation of the channel response (e.g., the channel taps) can be performed jointly with the estimating of the time-varying parameter set (essentially including the channel tap or equalization weight estimations as part of the time-varying parameter set), according to some embodiments, a significant savings in complexity is realized by instead using the remodulated signals as a reference (named model samples) to a bank of adaptive time domain equalizers that operate on the input sample stream and reverses the channel effects. A final stage of adaptive filtering (which can be seen as the complement to the initial equalization) can then be done, again using the remodulated signals as a reference, to optimally excise the aggregate interference from the received samples by compensating for fine-grain time offsets along with estimating and recreating channel distortion effects experienced by the interference.

Figure 3:
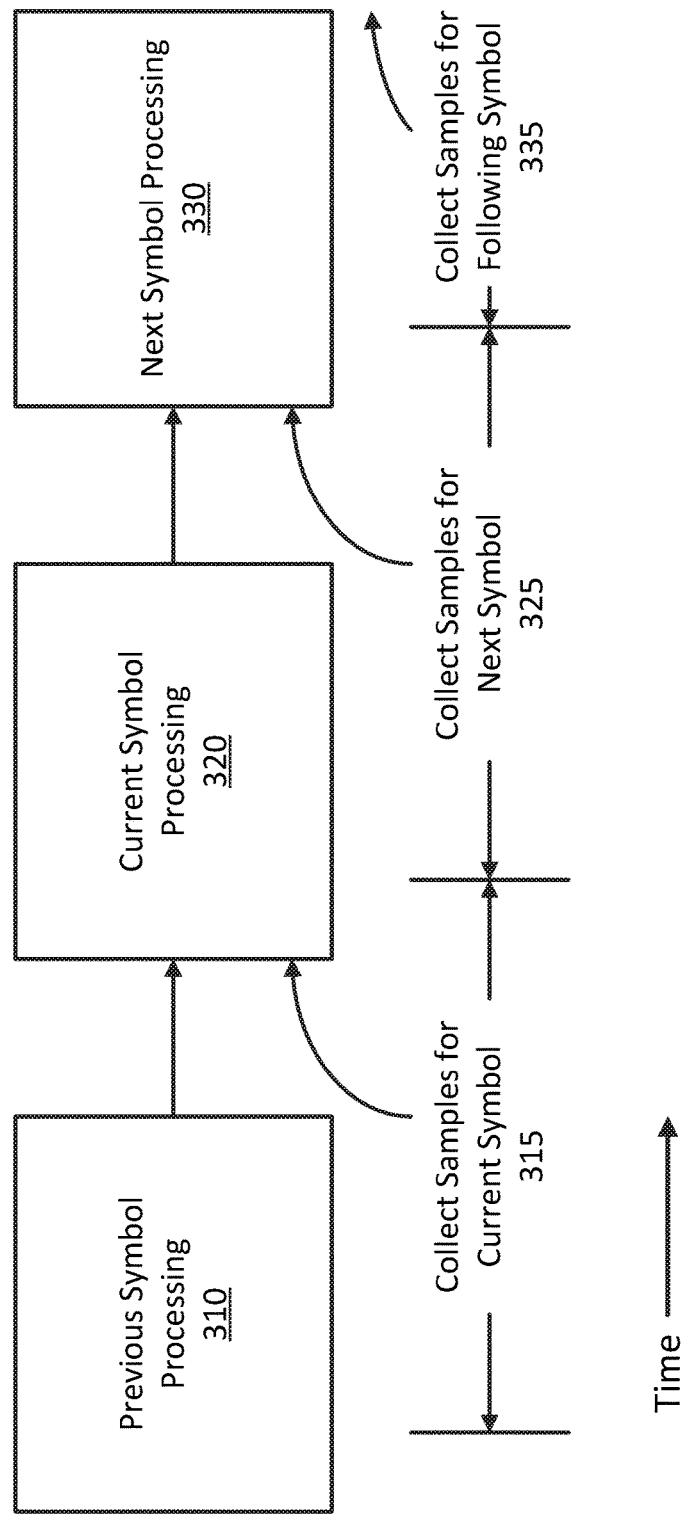
FIG. 3 is a block diagram of an example symbol processing timeline, according to an embodiment of the present disclosure.

FIG. 3 is a block diagram of an example symbol processing timeline 300, according to an embodiment of the present disclosure. In FIG. 3, time advances from left to right. In the symbol processing timeline 300, symbols in the SOI are processed one at a time, starting with the previous symbol processing 310, then the current symbol processing 320, and then the next symbol processing 330 (and then a following symbol processing, and so on). During most of the previous symbol processing 310, samples are collected for the current symbol 315. For example, the end of the samples for the current symbol is predicted based on the end of the samples for the previous symbol. In a similar fashion, during most of the current symbol processing 320, samples are collected for the next symbol 325, and during most of the next symbol processing 330, samples are collected for the following symbol 335. During the current symbol processing 320, the end of the samples corresponding to the current symbol is actually determined or better estimated. That information is passed on to the next symbol processing 330 to predict when to stop collecting samples for the next symbol 325. This symbol period estimation continues similarly for the following symbol 335, and so on.

Figure 4:
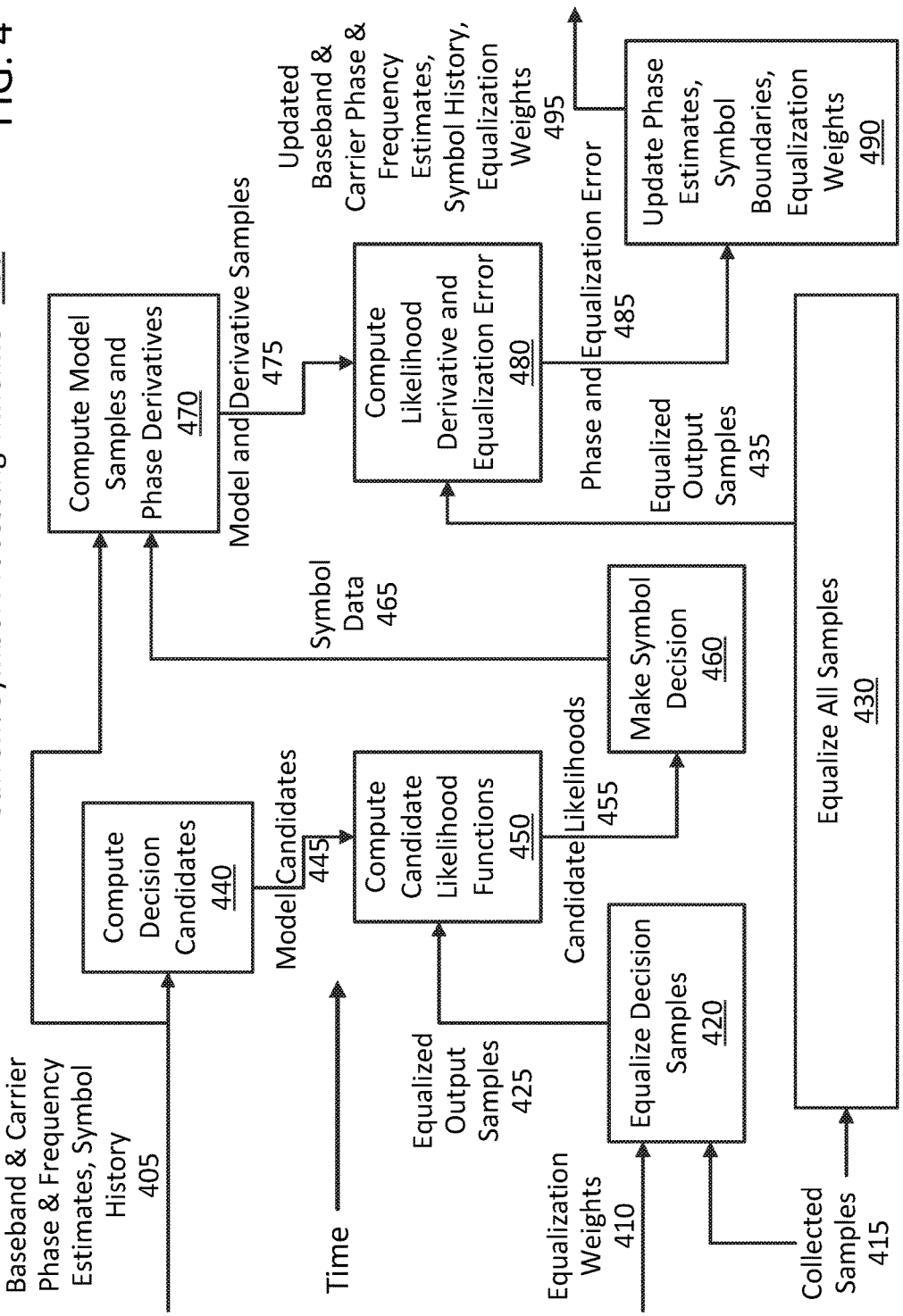
FIG. 4 is a block diagram of an example current symbol processing timeline of the symbol processing timeline of FIG. 3, according to an embodiment of the present disclosure.

FIG. 4 is a block diagram of an example current symbol processing timeline 400 of the symbol processing timeline 300 of FIG. 3, according to an embodiment of the present disclosure. In FIG. 4, as in FIG. 3, time advances from left to right. In addition, the overlap of the different processing portions (represented in FIG. 4 as boxes) in the time dimension (e.g., overlap in the vertical or up-down direction) provides an indication of the amount of possible concurrency that can take place between the respective portions.

In the current symbol processing timeline 400, processing begins with inputting a set of continuous symbol parameter estimates 405 generated from the previous symbol processing interval (e.g., previous symbol processing 310 in FIG. 3). These include estimates for baseband (e.g., symbol) and carrier phases and frequencies, as well as for symbol history. Additional inputs come from a set of channel tap coefficients 410 (e.g., equalization weights, such as those used to generate a finite impulse response) used to represent an estimate of the aggregate wireless channel that was estimated in the previous symbol processing interval (e.g., previous symbol processing 310 in FIG. 3). Further, specific collected samples 415 drawn from the received sample pipeline, which originated from the receiver input terminal analog-to-digital conversion process, are input as belonging to the current symbol being processed. These samples 415 have been adaptively selected and are currently believed (based on estimated symbol boundaries) to belong to the current symbol. During the symbol processing, that determination will be verified and, if incorrect, will be used to adaptively adjust the number of samples for the next symbol. In this fashion, the current symbol processing 400 uses a blind adaptive technique that adapts to varying symbol lengths without cooperation of the transmitter protocol.

After collecting the samples 415 for the current symbol, the current symbol processing 400 enters decision mode, where the discrete value of the current symbol is decided (or estimated) based on a subset of the collected samples 415 predicted to be part of the current symbol. To save processing resources and lessen the chance of including samples from which the current symbol is not as identifiable, the subset can be smaller (such as less than half) than the size of the current sampling interval. These decision samples are equalized 420 by being passed through an adaptive filter that is used to compensate (e.g., invert or deconvolve) for distortion effects induced by the aggregate wireless channel. This channel is unknown and is estimated via blind adaptive equalization iteratively. This produces equalized output samples 425 that are assumed to contain an additive combination of the signal being tracked (e.g., the interfering signal) along with a noise term that is assumed to be zero-mean Gaussian noise. In some other embodiments, the noise is assumed to follow some other characterization.

While all the samples associated with the current symbol could be used here for the decision samples during the decision mode, an adaptive selection process is used instead to reduce or minimize the number of samples (e.g., to a half, a quarter, a sixth, or some such smaller subset) used or needed for the symbol estimation process. These selected samples are called decision samples. The decision samples are chosen to increase or maximize signal-to-noise ratio (SNR) and reduce or minimize the probability of selecting samples that are not actually part of the current symbol. In some embodiments, the predicted SNR (which drives the choice of each sample) at each sample depends on where it is located within the predicted symbol boundaries. For example, samples that are timewise in the middle of the set of samples predicted to be part of the current symbol may have the best-defined symbol values, as determined (e.g., adapted to) over time.

Concurrent with the decision sample equalization 420, all input samples associated with the current symbol interval are equalized 430 by being passed through an adaptive filter that is used to compensate (e.g., invert or deconvolve) for distortion induced by the aggregate wireless channel. This channel is unknown and is estimated via blind adaptive equalization. The equalized output samples 435 are assumed to contain an additive combination of the signal being tracked (e.g., the interfering signal) along with assumed zero-mean Gaussian noise. In some other embodiments, the noise is assumed to follow some other characterization.

Using the set of continuous symbol parameter estimates 405, a model prediction of the possible decision candidates and the time-varying parameters is computed 440 for the received decision samples. Multiple candidates 445 are generated by enumerating all possible values for the current symbol (which is unknown and yet to be decided or estimated). In addition, predictions of the continuous communication parameters are also made based on the estimated previous values of the parameters. The equalized output samples 425 along with the model candidates and parameter predictions 445 are used to compute 450 the likelihood function 455 for the current symbol value for each possible candidate 445. The candidate likelihood functions 455 (symbol decision likelihoods) are used to compute the error between the model and the decision samples 425 for each of the symbol candidates 445 (e.g., the difference between the modeled behavior assuming a particular symbol candidate and the observed behavior as captured by the samples).

The symbol candidate 445 with the highest likelihood value is chosen 460 as the current symbol estimate (decided symbol) 465 by performing a norm minimization. Depending on factors such as the signal model being used, there may be significant inter-symbol interference (ISI) present, in which case the norm minimization can be determined using a manner analogous to maximum-likelihood sequence estimation (MLSE). The estimated or decided symbol 465 (or symbol sequence) is then passed on as output to subsequent processes.

After the current symbol data 465 has been determined or estimated, the current symbol processing 400 enters estimation mode, where the predictions of the continuous parameters, e.g., communication protocol or modulation parameters such as symbol rate, frequency, carrier frequency offset, carrier phase, and the like, that are used to model the communication behavior that is being observed through the samples, are refined or better estimated based on the observed samples for the current symbol interval. The model predictions for all samples associated with the current symbol interval are generated 470 based on the symbol data 465 along with the previous parameter estimates 405. Additionally, partial derivative terms (such as phase derivatives) with respect to each of the continuous model parameters to be estimated are generated 470. The generated model prediction and partial derivative term sample outputs 475 are then passed along together with the equalized output samples 435 to compute 480 partial derivatives of the likelihood function with respect to each of the continuous parameters being estimated. Additionally, an equalization error term 485 based on the difference between the equalized output samples 435 and the model prediction and partial derivative term sample outputs 475 is generated 480.

The generated likelihood derivative and estimated equalization error terms 485 are used to refine or update 490 the estimated parameter set for the current symbol interval. This refinement 490 can be made, for example, by correcting parameter predictions 405 that were generated based on the previous symbol processing interval in conjunction with the feedback error terms 485 generated in the likelihood derivative and equalization error computations 480. This results in updated phase and frequency estimations for baseband (symbol) and carrier signals, updated symbol history, and updated equalization weights 495 being output from the current symbol processing 400 to be used as input for the next symbol processing (such as the next symbol processing 330 interval in FIG. 3). This final estimated parameter set 495 can include continuous phase, frequency, and tap coefficient (or equalization weight) components along with symbol value discrete estimates that are stored and used as input for the next symbol processing interval.

Figure 5B:
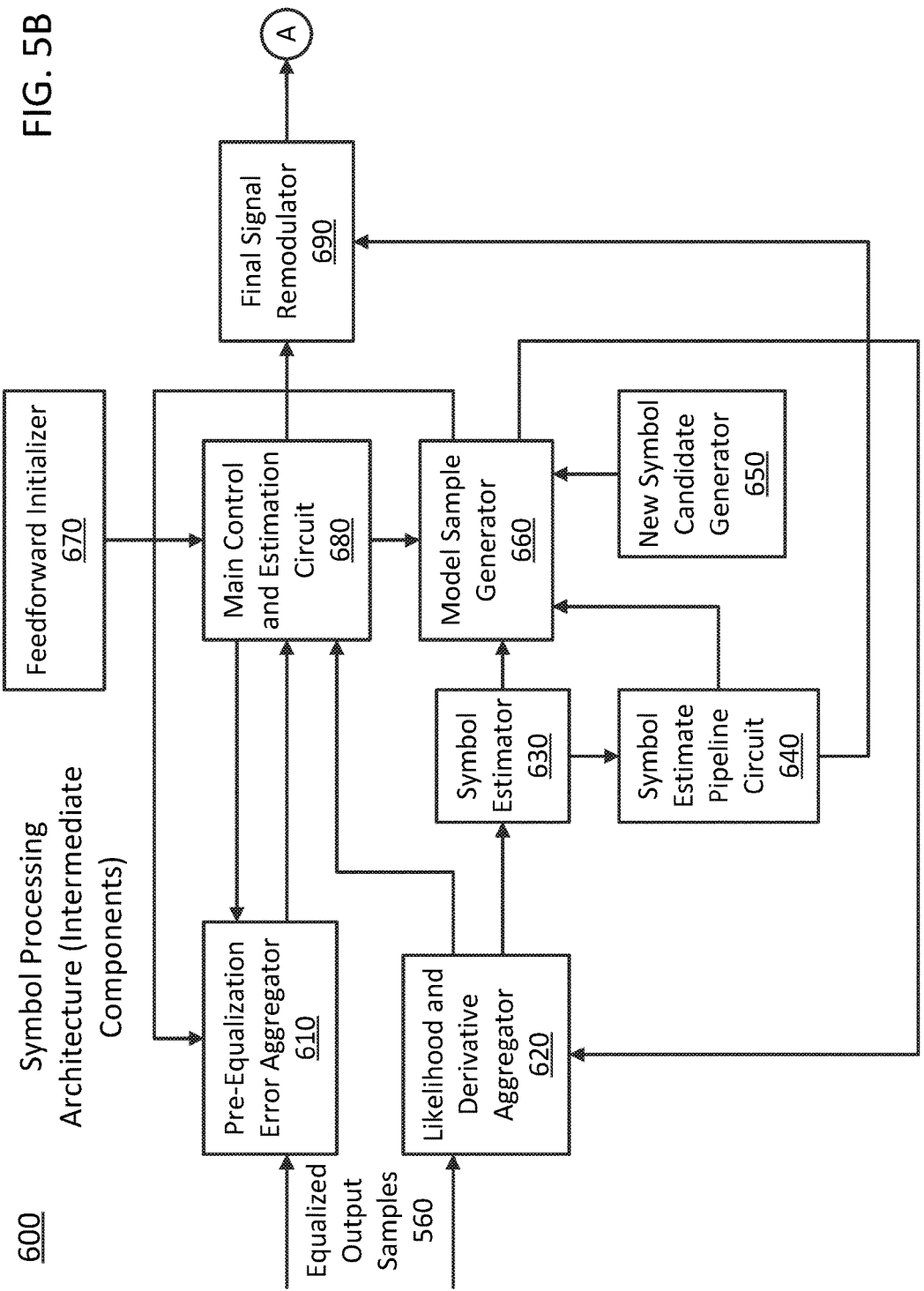

FIGS. 5A-5B are block diagrams of an example symbol processing architecture 500 and 600 according to an embodiment of the present disclosure. The symbol processing architecture 500 and 600 is illustrated in two components, including front and back ends 500 in FIG. 5A, and intermediate components 600 in FIG. 5B, with the front end being represented by components 510-560 and the back end being represented by components 510-520 and 570-590 (components 510-520 being part of both the front end and the back end). The final output of the intermediate components 600 (labeled A) is input to the back end portion of the front and back ends 500.

In the front end portion of FIG. 5A, input samples 510 are passed to the pre-AGC sample pipeline circuit 520. From the pre-AGC sample pipeline circuit 520, the sample stream is demultiplexed, one set of input samples being passed along the front end to the (digital) automatic gain control (AGC) circuit 530, and another set of input samples being passed along the back end to the blind signal interference cancelation (SIC) equalizer 570. In the back end, the raw input samples from the pre-AGC sample pipeline circuit 520 are compared against the output of the final signal remodulator 690 (see intermediate components 600 in FIG. 5B) to generate the final output stream 580 (e.g., the SOI 175 of FIG. 2) and the health values 590 (e.g., measuring error and other metrics used as feedback to correct earlier modeling estimates to better match the actual input samples). For example, the remodulated interference signals can be excised from the raw input samples to leave the SOI 175 (and possibly other noise) in the final output stream 580.

In the front-end processing, the input samples from the pre-AGC sample pipeline circuit 520 are passed to the AGC circuit 530, which performs digital gain control on the samples to better amplify weak signals (such as signals whose modulated waveforms are being modeled) or attenuate strong interference or noise in the samples. From the AGC circuit 530, the gain-controlled samples are passed to the post-AGC sample pipeline circuit 540. The post-AGC sample pipeline circuit 540 selects some of the samples to be decision samples (for use during the decision mode portion of the technique, as described above in reference to FIG. 4). The decision samples are sent to the pre-equalizer 550 (for decision sample equalization) together with a set of channel tap coefficients (such as channel tap coefficients or equalization weights 410 of FIG. 4), while all the samples are sent to the pre-equalizer 550 (for sample equalization) in another pipeline. The pre-equalizer 550 equalizes the input samples, such as passes them through an adaptive filter that is used to compensate (e.g., invert or deconvolve) for distortion induced by the aggregate wireless channel. The pre-equalizer 550 outputs equalized output samples 560 (such as equalized output samples 425 and 435 of FIG. 4), which are passed to the intermediate components 600 as illustrated in FIG. 5B.

In the intermediate components 600 of FIG. 5B, new symbol candidate generator 650 generates a symbol candidate matrix (such as model candidates 445 of FIG. 4) of all possible values for the current symbol and passes the symbol candidate matrix to the model sample generator 660. Further, the main control and estimation circuit 680 provides predictions of the time-varying (e.g., continuous) parameters for the current interval and passes the predictions to the model sample generator 660. The model sample generator 660 takes the symbol candidate matrix and the parameter predictions and generates model candidate symbol values and samples, and passes these model candidates and samples to the likelihood and derivative aggregator 620.

The likelihood and derivative aggregator 620 combines the model candidates and samples along with the equalized output samples 560 for the decision samples, and computes the candidate likelihood functions (such as candidate likelihoods 455 in FIG. 4) for each of the model candidates and passes the candidate likelihoods to the symbol estimator 630. The symbol estimator 630 takes the candidate likelihoods and selects the symbol estimate with the highest likelihood value to be the current symbol (e.g., most consistent or highest likelihood of generating the observed decision samples), and generates full or partial symbol estimates for the selected symbol that are passed to the symbol estimate pipeline circuit 640. The symbol estimate pipeline circuit 640 takes the full or partial symbol estimate and adds the current symbol to the symbol history vector (e.g., up to four past or most recent symbols). The symbol history vector is passed by the symbol estimate pipeline circuit 640 to the model sample generator 660 and the final signal remodulator 690.

A feedforward initializer 670 is active at the beginning of processing a particular communications stream (such as an interference stream or other stream being modeled) and provides initial coarse estimates of parameters such as baseband and carrier frequency to the main control and estimation circuit 680. The main control and estimation circuit 680 maintains modeling information from the previous symbol processing, such as baseband and carrier phase estimates, baseband and carrier frequency estimates, symbol history, and equalization weight estimates. The main control and estimation circuit 680 passes some of these parameter estimates to the model sample generator 660, such as the previous sample symbol (baseband) frequency and carrier frequency estimates, the number of samples, and the previous sample symbol (baseband) phase and carrier phase estimates. Further, the main control and estimation circuit 680 passes the equalization weight updates to the pre-equalizer error aggregator 610. In addition, the symbol estimator 630 passes the selected candidate index (of the model candidates provided by the model sample generator 660) to the model sample generator 660 while the symbol estimate pipeline circuit 640 passes the symbol history vector to the model sample generator 660. The model sample generator 660 takes these inputs and generates the model samples, the model symbol (baseband) derivatives (such as phase derivatives), and the model carrier derivatives (such as phase derivatives), which are passed to the likelihood and derivative aggregator 620 (see, for example, the generated model prediction and partial derivative term sample outputs 475 of FIG. 4). In addition, the model sample generator 660 also passes the model samples to the pre-equalization error aggregator 610.

The likelihood and derivative aggregator 620 takes the model samples and model derivatives as input along with the equalized output samples 560 and generates the aggregate likelihood derivatives (e.g., feedback error, as in the phase error 485 in FIG. 4), such as the partial derivatives of the likelihood function with respect to each of the continuous parameters being estimated, and passes these outputs to the main control and estimation circuit 680. In addition, the pre-equalization error aggregator 610 takes the model samples and the equalized output samples along with the equalization weight updates (from the main control and estimation circuit 680) and generates the aggregate equalization error (e.g., the equalization error term 485 in FIG. 4).

The main control and estimation circuit 680 takes the aggregate likelihood derivatives (feedback error) and the aggregate equalization error and updates the phase estimates (such as the current symbol (baseband) and carrier phases), the frequency estimates (such as the current symbol (baseband) and carrier frequencies), the symbol boundary estimate for the next symbol (based on the current symbol), and the equalization weights, and passes these updated parameter estimates to the final signal remodulator 690. The final signal remodulator 690 takes these inputs together with the symbol history vector (with respect to the current symbol) from the symbol estimate pipeline circuit 640 and reconstructs the signal being tracked (e.g., interference) from the estimated model parameters most likely to generate the observed samples. The final signal remodulator passes these reconstructed components to the blind SIC equalizer 570 to separate the final output stream 580 (e.g., the SOI) from the interference (e.g., by excising the modeled contribution of the interference from the received sample sequence).

FIG. 6 is a flow diagram of an example current symbol processing method 700, according to an embodiment of the present disclosure.

The method 700 and other methods described herein may be implemented in hardware or software, or some combination of the two. For example, the method 700 may be implemented by the components of FIGS. 1-2 and 5A-5B. In another embodiment, the method 700 may be implemented be a custom circuit such as a field programmable gate array (FPGA) configured to carry out the method 700. In other embodiments, the method 700 may be performed by a special purpose processor, such as a signal processor.

In some other embodiments, the method 700 may be implemented as a series of computer instructions, such as software, firmware, or a combination of the two, together with one or more computer processors (e.g., one or more microprocessors). The instructions, when executed on a given processor, cause the method 700 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause the method 700 (or other method described herein) to be carried out for adaptive receiving. In addition, while the methods described herein may appear to have a certain order to their operations, other embodiments may not be so limited. Accordingly, the order of the operations can be varied between embodiments, as would be apparent in light of this disclosure.

In a similar light, the components in FIGS. 1-2 and 5A-5B and other circuits disclosed herein may be custom hardware circuits or general-purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

Referring to the method 700 of FIG. 6, processing begins with modeling 710 a digitally-modulated radio frequency (RF) communication stream using a set of incoming samples of the stream collected from a single antenna. The stream includes a first signal. The first signal includes a sequence of first digital symbols including a previous symbol and a current symbol. Each first digital symbol is chosen from a plurality of first possible values. The first signal is modulated by a first known RF communication protocol having unknown time-varying parameters. The parameters have estimated previous values from modeling the previous symbol using a previous interval of the samples corresponding to the previous symbol. The method 700 further includes collecting 720 a current interval of the samples. The current interval begins after an end of the previous interval and corresponds to the current symbol. The method 700 further includes predicting 730 an end of the current interval, and current values of the parameters, based on the estimated previous values of the parameters. The method 700 further includes deciding 740 a value of the current symbol using maximum likelihood estimation based on the first possible values, the predicted current values of the parameters, and a subset of the collected current interval of the samples. The method 700 further includes estimating 750 the current values of the parameters using maximum likelihood estimation based on the decided value of the current symbol, the collected current interval of the samples, and the predicted current values of the parameters.

Further Example Embodiments

The following examples pertain to further embodiments, from which numerous permutations and configurations will be apparent.

Example 1 is a method of digital signal processing including: modeling, by a signal processor, a digitally-modulated radio frequency (RF) communication stream using a set of incoming samples of the stream collected from a single antenna, the stream including a first signal, the first signal including a sequence of first digital symbols including a previous symbol and a current symbol, each first digital symbol being chosen from a plurality of first possible values, the first signal being modulated by a first known RF communication protocol having unknown time-varying parameters, the parameters having estimated previous values from modeling the previous symbol using a previous interval of the samples corresponding to the previous symbol; collecting, by the signal processor, a current interval of the samples, the current interval beginning after an end of the previous interval and corresponding to the current symbol; predicting, by the signal processor, an end of the current interval, and current values of the parameters, based on the estimated previous values of the parameters; deciding, by the signal processor, a value of the current symbol using maximum likelihood estimation based on the first possible values, the predicted current values of the parameters, and a subset of the collected current interval of the samples; and estimating, by the signal processor, the current values of the parameters using maximum likelihood estimation based on the decided value of the current symbol, the collected current interval of the samples, and the predicted current values of the parameters.

Example 2 includes the subject matter of Example 1, where the subset of the collected current interval of the samples is less than half the samples of the collected current interval.

Example 3 includes the subject matter of Example 1, further including collecting, by the signal processor, a next interval of the samples concurrently with the deciding of the value of the current symbol and the estimating of the current values of the parameters, the next interval beginning after the predicted end of the current interval and corresponding to a next symbol of the first signal.

Example 4 includes the subject matter of Example 3, further including: predicting, by the signal processor, an end of the next interval of the samples, and next values of the parameters, based on the estimated current values of the parameters; deciding, by the signal processor, a value of the next symbol using maximum likelihood estimation based on the collected next interval of the samples and the predicted next values of the parameters; and estimating, by the signal processor, the next values of the parameters using maximum likelihood estimation based on the decided value of the next symbol, the collected next interval of the samples, and the predicted next values of the parameters.

Example 5 includes the subject matter of Example 1, further including: remodulating, by the signal processor, the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; and excising, by the signal processor, the first signal from the incoming samples using the recreated corresponding components of the first signal.

Example 6 includes the subject matter of Example 1, where the communication stream further includes a second signal, the second signal including a sequence of second digital symbols including a second previous symbol and a second current symbol, each first digital symbol being chosen from a plurality of second possible values, the second signal being modulated by a second known RF communication protocol having unknown time-varying second parameters, the second parameters having estimated previous values from modeling the second previous symbol using a second previous interval of the samples corresponding to the second previous symbol, the method further including: collecting, by the signal processor, a second current interval of the samples, the second current interval beginning after an end of the second previous interval and corresponding to the second current symbol; predicting, by the signal processor, an end of the second current interval, and current values of the second parameters, based on the estimated previous values of the second parameters; deciding, by the signal processor, a value of the second current symbol using maximum likelihood estimation based on the second possible values, the predicted current values of the second parameters, and a subset of the collected second current interval of the samples; and estimating, by the signal processor, the current values of the second parameters using maximum likelihood estimation based on the decided value of the second current symbol, the collected second current interval of the samples, and the predicted current values of the second parameters.

Example 7 includes the subject matter of Example 6, further including: remodulating, by the signal processor, the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; remodulating, by the signal processor, the decided values of the second current symbol, the second previous symbol, and earlier ones of the second digital symbols using the second known RF communication protocol according to the estimated current values of the second parameters, the estimated previous values of the second parameters, and estimated earlier values of the second parameters, respectively, to recreate corresponding components of the second signal; and excising, by the signal processor, the first and second signals from the incoming samples using the recreated corresponding components of the first and second signals.

Example 8 is a digital signal processor including: a signal modeling circuit to model a digitally-modulated radio frequency (RF) communication stream using a set of incoming samples of the stream collected from a single antenna, the stream including a first signal, the first signal including a sequence of first digital symbols including a previous symbol and a current symbol, each first digital symbol being chosen from a plurality of first possible values, the first signal being modulated by a first known RF communication protocol having unknown time-varying parameters, the parameters having estimated previous values from modeling the previous symbol using a previous interval of the samples corresponding to the previous symbol; a sample collecting circuit to collect a current interval of the samples, the current interval beginning after an end of the previous interval and corresponding to the current symbol; a parameter predicting circuit to predict an end of the current interval and current values of the parameters based on the estimated previous values of the parameters; a symbol deciding circuit to decide a value of the current symbol using maximum likelihood estimation based on the first possible values, the predicted current values of the parameters, and a subset of the collected current interval of the samples; and a parameter estimating circuit to estimate the current values of the parameters using maximum likelihood estimation based on the decided value of the current symbol, the collected current interval of the samples, and the predicted current values of the parameters.

Example 9 includes the subject matter of Example 8, where the subset of the collected current interval of the samples is less than half the samples of the collected current interval.

Example 10 includes the subject matter of Example 8, where the sample collecting circuit is further to collect a next interval of the samples concurrently with the symbol deciding circuit deciding the value of the current symbol and the parameter estimating circuit estimating the current values of the parameters, the next interval beginning after the predicted end of the current interval and corresponding to a next symbol of the first signal.

Example 11 includes the subject matter of Example 10, where the parameter predicting circuit is further to predict an end of the next interval of the samples and next values of the parameters based on the estimated current values of the parameters, the symbol deciding circuit is further to decide a value of the next symbol using maximum likelihood estimation based on the collected next interval of the samples and the predicted next values of the parameters, and the parameter estimating circuit is further to estimate the next values of the parameters using maximum likelihood estimation based on the decided value of the next symbol, the collected next interval of the samples, and the predicted next values of the parameters.

Example 12 includes the subject matter of Example 8, further including: a signal remodulating circuit to remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; and a signal excising circuit to excise the first signal from the incoming samples using the recreated corresponding components of the first signal.

Example 13 includes the subject matter of Example 8, where the communication stream further includes a second signal, the second signal including a sequence of second digital symbols including a second previous symbol and a second current symbol, each first digital symbol being chosen from a plurality of second possible values, the second signal being modulated by a second known RF communication protocol having unknown time-varying second parameters, the second parameters having estimated previous values from modeling the second previous symbol using a second previous interval of the samples corresponding to the second previous symbol, the symbol collecting circuit is further to collect a second current interval of the samples, the second current interval beginning after an end of the second previous interval and corresponding to the second current symbol, the parameter predicting circuit is further to predict an end of the second current interval and current values of the second parameters based on the estimated previous values of the second parameters, the symbol deciding circuit is further to decide a value of the second current symbol using maximum likelihood estimation based on the second possible values, the predicted current values of the second parameters, and a subset of the collected second current interval of the samples, and the parameter estimating circuit is further to estimate the current values of the second parameters using maximum likelihood estimation based on the decided value of the second current symbol, the collected second current interval of the samples, and the predicted current values of the second parameters.

Example 14 includes the subject matter of Example 13, further including: a signal remodulating circuit to remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal, and remodulate the decided values of the second current symbol, the second previous symbol, and earlier ones of the second digital symbols using the second known RF communication protocol according to the estimated current values of the second parameters, the estimated previous values of the second parameters, and estimated earlier values of the second parameters, respectively, to recreate corresponding components of the second signal; and a signal excising circuit to excise the first and second signals from the incoming samples using the recreated corresponding components of the first and second signals.

Example 15 is a digital receiver including: a radio frequency (RF) front end to receive analog RF signals of a digitally-modulated RF communication stream from a single antenna, the stream including a first signal, the first signal including a sequence of first digital symbols including a previous symbol and a current symbol, each first digital symbol being chosen from a plurality of first possible values, the first signal being modulated by a first known RF communication protocol having unknown time-varying parameters; an intermediate frequency (IF) front end to convert the received analog RF signals to analog intermediate frequency (IF) signals; an analog-to-digital converter (ADC) to convert the analog IF signals to a set of incoming samples of the stream; and a digital signal processor including a signal modeling circuit to model the communication stream using the set of incoming samples, the parameters having previous estimated values from modeling the previous symbol using a previous interval of the samples corresponding to the previous symbol, a sample collecting circuit to collect a current interval of the samples, the current interval beginning after an end of the previous interval and corresponding to the current symbol, a parameter predicting circuit to predict an end of the current interval and current values of the parameters based on the estimated previous values of the parameters, a symbol deciding circuit to decide a value of the current symbol using maximum likelihood estimation based on the first possible values, the predicted current values of the parameters, and a subset of the collected current interval of the samples, and a parameter estimating circuit to estimate the current values of the parameters using maximum likelihood estimation based on the decided value of the current symbol, the collected current interval of the samples, and the predicted current values of the parameters.

Example 16 includes the subject matter of Example 15, where the sample collecting circuit is further to collect a next interval of the samples concurrently with the symbol deciding circuit deciding the value of the current symbol and the parameter estimating circuit estimating the current values of the parameters, the next interval beginning after the predicted end of the current interval and corresponding to a next symbol of the first signal.

Example 17 includes the subject matter of Example 16, where the parameter predicting circuit is further to predict an end of the next interval of the samples and next values of the parameters based on the estimated current values of the parameters, the symbol deciding circuit is further to decide a value of the next symbol using maximum likelihood estimation based on the collected next interval of the samples and the predicted next values of the parameters, and the parameter estimating circuit is further to estimate the next values of the parameters using maximum likelihood estimation based on the decided value of the next symbol, the collected next interval of the samples, and the predicted next values of the parameters.

Example 18 includes the subject matter of Example 15, where the signal processor further includes: a signal remodulating circuit to remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; and a signal excising circuit to excise the first signal from the incoming samples using the recreated corresponding components of the first signal.

Example 19 includes the subject matter of Example 15, where the communication stream further includes a second signal, the second signal including a sequence of second digital symbols including a second previous symbol and a second current symbol, each first digital symbol being chosen from a plurality of second possible values, the second signal being modulated by a second known RF communication protocol having unknown time-varying second parameters, the second parameters having estimated previous values from modeling the second previous symbol using a second previous interval of the samples corresponding to the second previous symbol, the symbol collecting circuit is further to collect a second current interval of the samples, the second current interval beginning after an end of the second previous interval and corresponding to the second current symbol, the parameter predicting circuit is further to predict an end of the second current interval and current values of the second parameters based on the estimated previous values of the second parameters, the symbol deciding circuit is further to decide a value of the second current symbol using maximum likelihood estimation based on the second possible values, the predicted current values of the second parameters, and a subset of the collected second current interval of the samples, and the parameter estimating circuit is further to estimate the current values of the second parameters using maximum likelihood estimation based on the decided value of the second current symbol, the collected second current interval of the samples, and the predicted current values of the second parameters.

Example 20 includes the subject matter of Example 19, where the signal processor further includes: a signal remodulating circuit to remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal, and remodulate the decided values of the second current symbol, the second previous symbol, and earlier ones of the second digital symbols using the second known RF communication protocol according to the estimated current values of the second parameters, the estimated previous values of the second parameters, and estimated earlier values of the second parameters, respectively, to recreate corresponding components of the second signal; and a signal excising circuit to excise the first and second signals from the incoming samples using the recreated corresponding components of the first and second signals.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A method of digital signal processing comprising:
   modeling, by a signal processor, a digitally-modulated radio frequency (RF) communication stream using a set of incoming samples of the stream collected from a single antenna, the stream including a first signal, the first signal comprising a sequence of first digital symbols including a previous symbol and a current symbol, each first digital symbol being chosen from a plurality of first possible values, the first signal being modulated by a first known RF communication protocol having unknown time-varying parameters, the parameters having estimated previous values from modeling the previous symbol using a previous interval of the samples corresponding to the previous symbol;
   collecting, by the signal processor, a current interval of the samples, the current interval beginning after an end of the previous interval and corresponding to the current symbol;
   predicting, by the signal processor, an end of the current interval, and current values of the parameters, based on the estimated previous values of the parameters;
   deciding, by the signal processor, a value of the current symbol using maximum likelihood estimation based on the first possible values, the predicted current values of the parameters, and a subset of the collected current interval of the samples; and
   estimating, by the signal processor, the current values of the parameters using maximum likelihood estimation based on the decided value of the current symbol, the collected current interval of the samples, and the predicted current values of the parameters.

2. The method of claim 1, wherein the subset of the collected current interval of the samples is less than half the samples of the collected current interval.

3. The method of claim 1, further comprising collecting, by the signal processor, a next interval of the samples concurrently with the deciding of the value of the current symbol and the estimating of the current values of the parameters, the next interval beginning after the predicted end of the current interval and corresponding to a next symbol of the first signal.

4. The method of claim 3, further comprising:
   predicting, by the signal processor, an end of the next interval of the samples, and next values of the parameters, based on the estimated current values of the parameters;
   deciding, by the signal processor, a value of the next symbol using maximum likelihood estimation based on the collected next interval of the samples and the predicted next values of the parameters; and estimating, by the signal processor, the next values of the parameters using maximum likelihood estimation based on the decided value of the next symbol, the collected next interval of the samples, and the predicted next values of the parameters.

5. The method of claim 1, further comprising:
remodulating, by the signal processor, the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; and
excising, by the signal processor, the first signal from the incoming samples using the recreated corresponding components of the first signal.

6. The method of claim 1, wherein the communication stream further includes a second signal, the second signal comprising a sequence of second digital symbols including a second previous symbol and a second current symbol, each first digital symbol being chosen from a plurality of second possible values, the second signal being modulated by a second known RF communication protocol having unknown time-varying second parameters, the second parameters having estimated previous values from modeling the second previous symbol using a second previous interval of the samples corresponding to the second previous symbol, the method further comprising:
collecting, by the signal processor, a second current interval of the samples, the second current interval beginning after an end of the second previous interval and corresponding to the second current symbol;
predicting, by the signal processor, an end of the second current interval, and current values of the second parameters, based on the estimated previous values of the second parameters;
deciding, by the signal processor, a value of the second current symbol using maximum likelihood estimation based on the second possible values, the predicted current values of the second parameters, and a subset of the collected second current interval of the samples; and
estimating, by the signal processor, the current values of the second parameters using maximum likelihood estimation based on the decided value of the second current symbol, the collected second current interval of the samples, and the predicted current values of the second parameters.

7. The method of claim 6, further comprising:
remodulating, by the signal processor, the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal;
remodulating, by the signal processor, the decided values of the second current symbol, the second previous symbol, and earlier ones of the second digital symbols using the second known RF communication protocol according to the estimated current values of the second parameters, the estimated previous values of the second parameters, and estimated earlier values of the second parameters, respectively, to recreate corresponding components of the second signal; and
excising, by the signal processor, the first and second signals from the incoming samples using the recreated corresponding components of the first and second signals.

8. A digital signal processor comprising:
a signal modeling circuit to model a digitally-modulated radio frequency (RF) communication stream using a set of incoming samples of the stream collected from a single antenna, the stream including a first signal, the first signal comprising a sequence of first digital symbols including a previous symbol and a current symbol, each first digital symbol being chosen from a plurality of first possible values, the first signal being modulated by a first known RF communication protocol having unknown time-varying parameters, the parameters having estimated previous values from modeling the previous symbol using a previous interval of the samples corresponding to the previous symbol;
a sample collecting circuit to collect a current interval of the samples, the current interval beginning after an end of the previous interval and corresponding to the current symbol;
a parameter predicting circuit to predict an end of the current interval and current values of the parameters based on the estimated previous values of the parameters;
a symbol deciding circuit to decide a value of the current symbol using maximum likelihood estimation based on the first possible values, the predicted current values of the parameters, and a subset of the collected current interval of the samples; and
a parameter estimating circuit to estimate the current values of the parameters using maximum likelihood estimation based on the decided value of the current symbol, the collected current interval of the samples, and the predicted current values of the parameters.

9. The signal processor of claim 8, wherein the subset of the collected current interval of the samples is less than half the samples of the collected current interval.

10. The signal processor of claim 8, wherein the sample collecting circuit is further to collect a next interval of the samples concurrently with the symbol deciding circuit deciding the value of the current symbol and the parameter estimating circuit estimating the current values of the parameters, the next interval beginning after the predicted end of the current interval and corresponding to a next symbol of the first signal.

11. The signal processor of claim 10, wherein
the parameter predicting circuit is further to predict an end of the next interval of the samples and next values of the parameters based on the estimated current values of the parameters,
the symbol deciding circuit is further to decide a value of the next symbol using maximum likelihood estimation based on the collected next interval of the samples and the predicted next values of the parameters, and
the parameter estimating circuit is further to estimate the next values of the parameters using maximum likelihood estimation based on the decided value of the next symbol, the collected next interval of the samples, and the predicted next values of the parameters.

12. The signal processor of claim 8, further comprising:
a signal remodulating circuit to remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; and
a signal excising circuit to excise the first signal from the incoming samples using the recreated corresponding components of the first signal.

13. The signal processor of claim 8, wherein
the communication stream further includes a second signal, the second signal comprising a sequence of second digital symbols including a second previous symbol and a second current symbol, each first digital symbol being chosen from a plurality of second possible values, the second signal being modulated by a second known RF communication protocol having unknown time-varying second parameters, the second parameters having estimated previous values from modeling the second previous symbol using a second previous interval of the samples corresponding to the second previous symbol,
the symbol collecting circuit is further to collect a second current interval of the samples, the second current interval beginning after an end of the second previous interval and corresponding to the second current symbol,
the parameter predicting circuit is further to predict an end of the second current interval and current values of the second parameters based on the estimated previous values of the second parameters,
the symbol deciding circuit is further to decide a value of the second current symbol using maximum likelihood estimation based on the second possible values, the predicted current values of the second parameters, and a subset of the collected second current interval of the samples, and
the parameter estimating circuit is further to estimate the current values of the second parameters using maximum likelihood estimation based on the decided value of the second current symbol, the collected second current interval of the samples, and the predicted current values of the second parameters.

14. The signal processor of claim 13, further comprising:
a signal remodulating circuit to
remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal, and
remodulate the decided values of the second current symbol, the second previous symbol, and earlier ones of the second digital symbols using the second known RF communication protocol according to the estimated current values of the second parameters, the estimated previous values of the second parameters, and estimated earlier values of the second parameters, respectively, to recreate corresponding components of the second signal; and
a signal excising circuit to excise the first and second signals from the incoming samples using the recreated corresponding components of the first and second signals.

15. A digital receiver comprising:
a radio frequency (RF) front end to receive analog RF signals of a digitally-modulated RF communication stream from a single antenna, the stream including a first signal, the first signal comprising a sequence of first digital symbols including a previous symbol and a current symbol, each first digital symbol being chosen from a plurality of first possible values, the first signal being modulated by a first known RF communication protocol having unknown time-varying parameters;
an intermediate frequency (IF) front end to convert the received analog RF signals to analog intermediate frequency (IF) signals;
an analog-to-digital converter (ADC) to convert the analog IF signals to a set of incoming samples of the stream; and
a digital signal processor including
a signal modeling circuit to model the communication stream using the set of incoming samples, the parameters having previous estimated values from modeling the previous symbol using a previous interval of the samples corresponding to the previous symbol,
a sample collecting circuit to collect a current interval of the samples, the current interval beginning after an end of the previous interval and corresponding to the current symbol,
a parameter predicting circuit to predict an end of the current interval and current values of the parameters based on the estimated previous values of the parameters,
a symbol deciding circuit to decide a value of the current symbol using maximum likelihood estimation based on the first possible values, the predicted current values of the parameters, and a subset of the collected current interval of the samples, and
a parameter estimating circuit to estimate the current values of the parameters using maximum likelihood estimation based on the decided value of the current symbol, the collected current interval of the samples, and the predicted current values of the parameters.

16. The receiver of claim 15, wherein the sample collecting circuit is further to collect a next interval of the samples concurrently with the symbol deciding circuit deciding the value of the current symbol and the parameter estimating circuit estimating the current values of the parameters, the next interval beginning after the predicted end of the current interval and corresponding to a next symbol of the first signal.

17. The receiver of claim 16, wherein
the parameter predicting circuit is further to predict an end of the next interval of the samples and next values of the parameters based on the estimated current values of the parameters,
the symbol deciding circuit is further to decide a value of the next symbol using maximum likelihood estimation based on the collected next interval of the samples and the predicted next values of the parameters, and
the parameter estimating circuit is further to estimate the next values of the parameters using maximum likelihood estimation based on the decided value of the next symbol, the collected next interval of the samples, and the predicted next values of the parameters.

18. The receiver of claim 15, wherein the signal processor further includes:
a signal remodulating circuit to remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal; and a signal excising circuit to excise the first signal from the incoming samples using the recreated corresponding components of the first signal.

19. The receiver of claim 15, wherein the communication stream further includes a second signal, the second signal comprising a sequence of second digital symbols including a second previous symbol and a second current symbol, each first digital symbol being chosen from a plurality of second possible values, the second signal being modulated by a second known RF communication protocol having unknown time-varying second parameters, the second parameters having estimated previous values from modeling the second previous symbol using a second previous interval of the samples corresponding to the second previous symbol, the symbol collecting circuit is further to collect a second current interval of the samples, the second current interval beginning after an end of the second previous interval and corresponding to the second current symbol, the parameter predicting circuit is further to predict an end of the second current interval and current values of the second parameters based on the estimated previous values of the second parameters, the symbol deciding circuit is further to decide a value of the second current symbol using maximum likelihood estimation based on the second possible values, the predicted current values of the second parameters, and a subset of the collected second current interval of the samples, and the parameter estimating circuit is further to estimate the current values of the second parameters using maximum likelihood estimation based on the decided value of the second current symbol, the collected second current interval of the samples, and the predicted current values of the second parameters.

20. The receiver of claim 19, wherein the signal processor further includes:

a signal remodulating circuit to
    remodulate the decided values of the current symbol, the previous symbol, and earlier ones of the first digital symbols using the first known RF communication protocol according to the estimated current values of the parameters, the estimated previous values of the parameters, and estimated earlier values of the parameters, respectively, to recreate corresponding components of the first signal, and
    remodulate the decided values of the second current symbol, the second previous symbol, and earlier ones of the second digital symbols using the second known RF communication protocol according to the estimated current values of the second parameters, the estimated previous values of the second parameters, and estimated earlier values of the second parameters, respectively, to recreate corresponding components of the second signal; and a signal excising circuit to excise the first and second signals from the incoming samples using the recreated corresponding components of the first and second signals.

* * * * *